(12) United States Patent
Suzuki

(10) Patent No.: US 6,427,118 B1
(45) Date of Patent: Jul. 30, 2002

(54) VEHICLE-MOUNTED NAVIGATION SYSTEM, AND RECORDING MEDIUM HAVING RECORDED THEREON A PROCESSING PROGRAM FOR USE THEREWITH

(75) Inventor: Takumi Suzuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/689,898

(22) Filed: Oct. 13, 2000

(30) Foreign Application Priority Data

Oct. 15, 1999 (JP) ............................................. 11-294377

(51) Int. Cl.[7] ........................... G01C 21/00; G01S 1/02; G01S 5/02; G06G 7/78
(52) U.S. Cl. .............................. 701/209; 701/200–208; 701/210-215; 701/23; 701/220; 701/24; 701/25; 701/26; 340/989; 340/990; 340/995; 340/988; 73/178 R; 342/357.13; 342/457; 345/33
(58) Field of Search ................................. 701/200–215, 701/220, 23, 24, 25, 26; 340/989, 990, 995, 988, 723, 727; 73/178 R; 342/357.13, 457; 345/33

(56) References Cited

U.S. PATENT DOCUMENTS

| 5,067,082 A | * | 11/1991 | Nimura et al. | 364/449 |
| 5,784,059 A | * | 7/1998 | Morimoto et al. | 345/353 |
| 6,006,161 A | * | 12/1999 | Katou | 701/212 |
| 6,035,235 A | * | 3/2000 | Hayashi et al. | 701/211 |
| 6,266,613 B1 | * | 7/2001 | Nimura et al. | 701/210 |

* cited by examiner

Primary Examiner—Yonel Beaulieu
Assistant Examiner—Ronnie Mancho
(74) Attorney, Agent, or Firm—Morgan, Lewis & Bockius LLP

(57) ABSTRACT

A vehicle-mounted navigation system (1) including: a facility information acquisition device (21) which acquires facility information, wherein the facility information is position information pertaining to the facilities located around the route; a facility selection device (22) which selects, from among the facilities recorded in the facility information, upon consideration of the vehicle's travel direction, facilities whose landmarks are to be displayed on a display section (4); and a landmark display device which displays, on the display section (4), landmarks of the facilities selected by the facility selection device (22) on the basis of the facility information.

10 Claims, 4 Drawing Sheets

VEHICLE-MOUNTED NAVIGATION SYSTEM, AND RECORDING MEDIUM HAVING RECORDED THEREON A PROCESSING PROGRAM FOR USE THEREWITH

BACKGROUND OF THE INVENTION

1. Field of the Invention

The present invention relates to a vehicle-mounted navigation system for guiding a vehicle to a destination. More particularly, the present invention relates to a vehicle-mounted navigation system capable of displaying, on a display section, only landmarks assigned to facilities selected, in consideration of the vehicle's travel direction, from among facilities located around a route. Further, the present invention relates to a recording medium having recorded thereon a processing program for use with the vehicle-mounted navigation system.

The present application is based on Japanese Patent Application No. Hei. 11-294377, which is incorporated herein by reference.

2. Description of the Related Art

When a driver retrieves a facility, such as the nearest gas station or convenience store, through use of a related vehicle-mounted navigation system (as developed by Yazaki corporation of Japan), landmarks assigned to all facilities located within a viewing range are displayed on a map screen of the display section. The landmarks of the facilities are displayed on the basis of information pertaining to the locations of respective facilities as originally stored in the system.

FIG. 4 shows an example map screen having landmarks displayed thereon. In connection with FIG. 4, C designates a convenience store; G designates a gas station; R designates a restaurant; B designates a bank; T designates a toilet (rest room); H designates a hotel; and P designates a parking lot. The current position of a vehicle is indicated by symbol M, and the vehicle is traveling along a route R.

The related car navigation system displays landmarks assigned to all the facilities located within a view range of a map screen without regard to the travel direction of the vehicle, as shown in FIG. 4. Thus, even landmarks assigned to facilities to which the vehicle cannot readily make a stop are displayed on the map screen.

For instance, the facilities located behind the vehicle, with respect to a travel direction thereof, have already been passed by the vehicle. Therefore, the vehicle has to make a U-turn in order to make a stop at one of those facilities. Thus, although the vehicle encounters difficulty in making a stop at the facilities located behind the vehicle, landmarks assigned to those facilities are displayed on the map screen shown in FIG. 4.

If, in the case of left-side driving, a median strip is provided in a road, a vehicle cannot enter a facility located on the right side with respect to the vehicle's travel direction. Nevertheless, landmarks assigned to all facilities located on the right side with respect to the travel direction of a vehicle are displayed, as shown in FIG. 4.

As mentioned above, the related vehicle-mounted navigation system indicates all landmarks assigned to facilities at which the vehicle encounters difficulty in making a stop, without consideration of the vehicle's travel direction.

In a case where all landmarks—located within an area where many facilities are located, such as an urban area— are displayed, a screen is filled with landmarks, thus rendering the display screen hard to read.

SUMMARY OF THE INVENTION

The present invention has been conceived in light of the above circumstances and is aimed at providing a vehicle-mounted navigation system capable of displaying, on a display section, only landmarks assigned to facilities selected in consideration of the travel direction of a vehicle. Further, the present invention is aimed at providing a recording medium, such as a computer readable medium, having recorded thereon a processing program for use with the navigation system.

To achieve the above and other objects, the present invention provides a vehicle-mounted navigation system which detects the current position and direction of travel of a vehicle, retrieves a route to a set destination, guides the vehicle to the destination along the route, and displays landmarks assigned to facilities located around the route, the system including:

a facility information acquisition device which acquires facility information, which facility information is position information pertaining to the facilities located around the route;

a facility selection device which selects, from among the facilities recorded in the facility information, upon consideration of the vehicle's travel direction, facilities whose landmarks are to be displayed; and a landmark display device which displays, on a display section, landmarks of the facilities selected by the facility selection device.

According to the present invention, facilities whose landmarks are to be displayed are selected upon consideration of the vehicle's travel direction. Therefore, facilities by which the vehicle has passed, or facilities located along a lane opposite the current lane, can be deleted. As a result, only the landmarks assigned to facilities at which the vehicle can readily make a stop are displayed on the display section. Further, the landmark displayed by the display device is representative of the type of facility located thereby.

Since useless landmarks are not displayed on the display section, the map display appearing on the display section becomes easy to read.

Preferably, in the case of left-side driving, the facility selection device selects facilities located on the left side with respect to the vehicle's travel direction. Similarly, in the case of right-side driving, the facility selection device selects facilities located on the right side with respect to the vehicle's travel direction.

According to the present invention, in the case of left-side driving, there are selected facilities located on the left side with respect to the vehicle's travel direction; facilities on the right side are not selected. In the case of right side driving, there are selected facilities located on the right side with respect to the vehicle's travel direction; facilities on the left side are not selected. Accordingly, only the landmarks assigned to facilities at which the vehicle can readily make a stop are displayed on the display section.

The present invention also provides a recording medium having recorded thereon a processing program for use with a vehicle-mounted navigation system, which system detects the current position and direction of travel of a vehicle, retrieves a route to a set destination, guides the vehicle to the destination along the route, and displays landmarks assigned to facilities located around the route, the program including:

a facility information acquisition processing routine for acquiring facility information, which facility information is position information pertaining to the facilities located around the route, a facility selection processing routine for selecting, from among the facilities recorded in the facility information, upon consideration of the vehicle's travel direction, facilities whose landmarks are to be displayed on a display section; and a landmark display processing routine for displaying, on the display section, landmarks of the facilities selected by the facility selection processing routine.

According to the present invention, facilities whose landmarks are to be displayed are selected by the facility selection processing routine—in consideration of the vehicle's travel direction. Therefore, facilities by which the vehicle has passed, or facilities located along a lane opposite the current lane, can be deleted. As a result, only the landmarks assigned to facilities at which the vehicle can readily make a stop are displayed on the display section.

Since useless landmarks are not displayed on the display section, the map display appearing on the display section becomes easy to read.

Preferably, in the case of left-side driving, facilities located on the left side with respect to the vehicle's travel direction are selected by the facility selection processing routine; facilities on the right side are not selected. Similarly in the case of right-side driving, facilities located on the right side with respect to the vehicle's travel direction are selected by the facility selection processing routine; facilities on the left side are not selected.

According to the present invention, in the case of left-side driving, the facility selection processing routine selects facilities located on the left side with respect to the vehicle's travel direction. In the case of right-side driving, the facility selection processing routine selects facilities located on the right side with respect to the vehicle's travel direction. Accordingly, only the landmarks assigned to facilities at which the vehicle can readily make a stop are displayed on the display section.

BRIEF DESCRIPTION OF THE DRAWINGS

Preferred embodiments of the invention will be described in connection with the drawings wherein.

DETAILED DESCRIPTION OF THE PREFERRED EMBODIMENT

A vehicle-mounted navigation system and a recording medium, such as a computer readable medium, having recorded thereon a processing program for use with the navigation system according to the present invention now will be described by reference to the accompanying drawings.

The hardware configuration of a vehicle-mounted navigation system according to an embodiment of the present invention now will be described by reference to FIG. 1.

Figure 1:
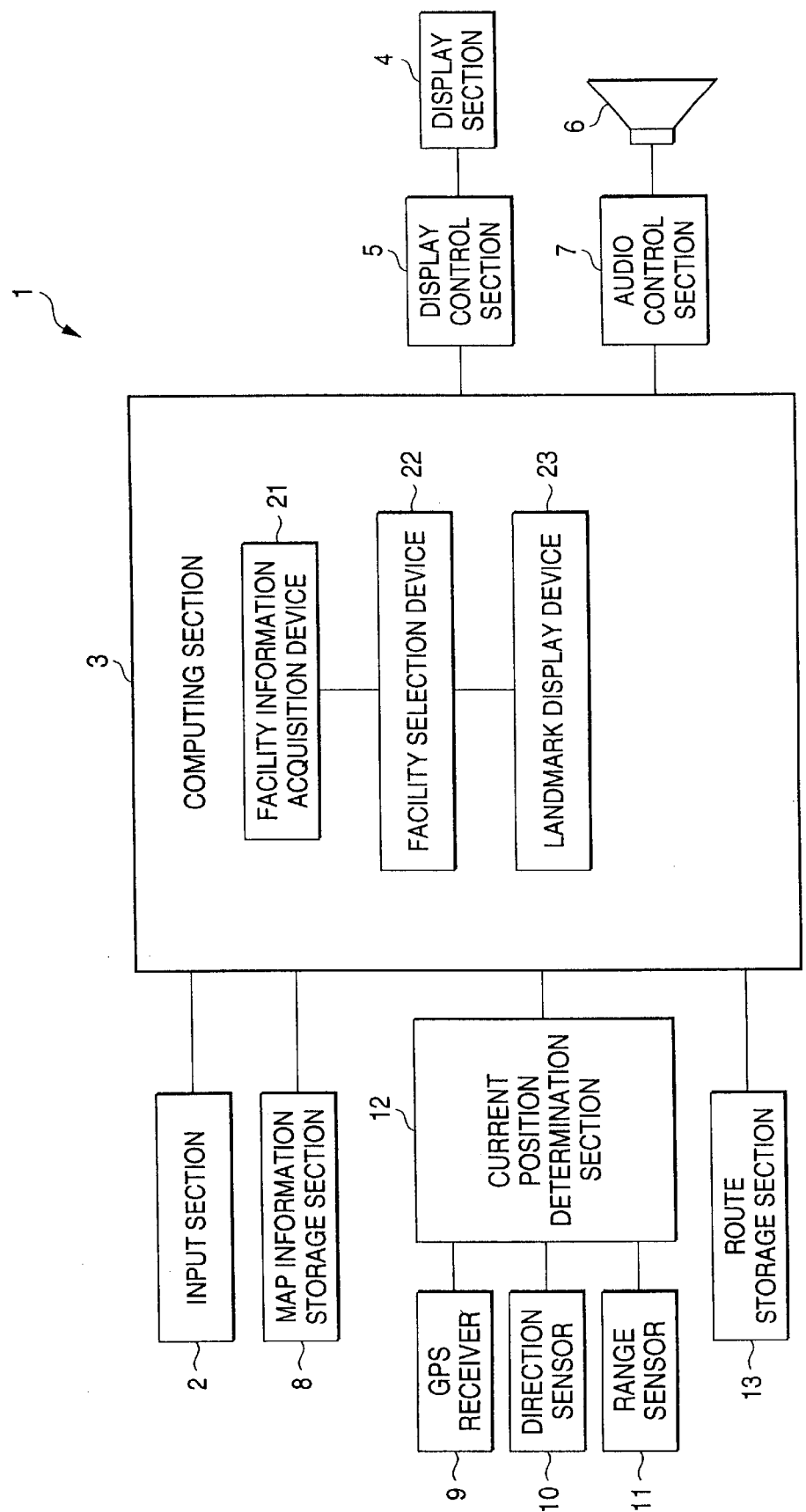
FIG. 1 is a block diagram showing the hardware configuration of a vehicle-mounted navigation system according to an embodiment of the present invention.

As shown in FIG. 1, a vehicle-mounted navigation system 1 according to the present invention includes an input section 2 for entering a destination, en route points, and driver's preferences; a computing section 3 for controlling the entire navigation system and for performing a computation for displaying landmarks; a display control section 5 for displaying, on a display section 4, a route set screen and a route guide screen having landmarks displayed thereon; an audio control section 7 for outputting a guide voice by activating a loudspeaker 6; a map information storage section 8 in which are recorded navigation data required for computing a route, facility information such as guide data required for performing guidance, and position information pertaining to facilities such as, for example, a gas station; a current position measurement section 12 for determining the current position and direction of travel of a vehicle upon receipt of information from a GPS receiver 9, a direction sensor 10, and a range sensor 11; and a route storage section 13 for storing data pertaining to a route to the destination, which data are retrieved by the computing section 3.

The computing section 3 includes a facility information acquisition device 21 for acquiring, from the map information storage section 8, facility information, which facility information is position information pertaining to facilities located around a route; a facility selection device 22 for selecting, from among facilities recorded in the facility information, upon consideration of the vehicle's travel direction, facilities whose landmarks are to be displayed on the display section 4; and a landmark display device 23 for displaying, on the map appearing on the display section 4, the landmarks of the facilities selected by the facility selection device 22. Further, the display device displays landmarks on the basis of the facility information. That is, the landmarks displayed are representative of the type of facility so designated thereby.

The computing section 3 includes, for example, an ordinary computer having a CPU for performing various processing operations, and having a storage device for storing instructions regarding the processing operations. Processing instructions and timing restrictions for the facility information acquisition device 21, those for the facility selection device 22, and those for the landmark display device 23—all of which devices are included in the computing section 3—are retained in the storage device. The processing instructions and timing restrictions are loaded to and executed by the CPU, as required.

Figure 2:
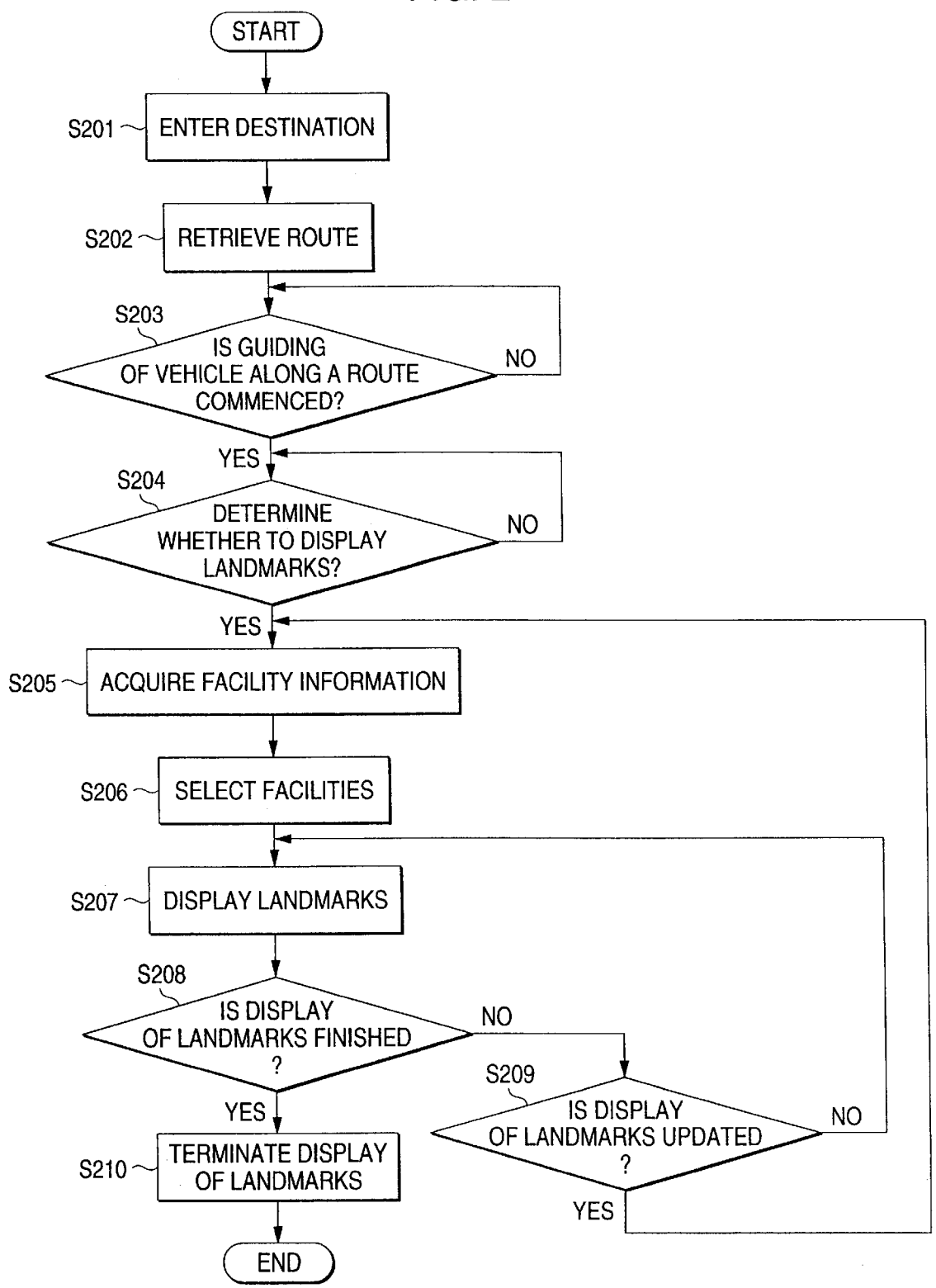
FIG. 2 is a flowchart for describing how the display of landmarks is performed by the vehicle-mounted navigation system shown in FIG. 1.

Next will be described, in accordance with the flowchart shown in FIG. 2, the display of facilities as performed by the vehicle-mounted navigation system according to one embodiment of the present invention.

When a driver enters, into the input section 2, information required for setting a route such as a destination and en route points (S201), the information is sent to the computing section 3. Then, by the computing section 3, a route from a starting location to the destination is retrieved by utilization of navigation data stored in the map information storage section 8 (S202).

When retrieval of a route is completed, the thus-retrieved route is stored in the route storage section 13 and is displayed on the display section 4. When the vehicle starts traveling, and guiding of the vehicle along the route is commenced (S203), the current position determination section 12 specifies the current position and travel direction of the vehicle upon receipt of information from the GPS receiver 9, the direction sensor 10, and the range sensor 11. The thus-determined current position of the vehicle is sent to the computing section 3, and the current position of the vehicle is displayed on the map display of the display section 4.

When the driver enters an instruction for displaying a landmark by actuation of the input section 2 (S204), the facility information acquisition device 21 of the computing section 3 acquires facility information stored in the map information storage section 8 (S205). The facility information includes, for example, position information pertaining to family restaurants, financial institutions, department stores, rest rooms, public restrooms, gas stations, hotels, Japanese-style inns, convenience stores, medical institutions, parking lots, etc.

After having acquired facility information, the facility selection device 22 selects—from among the facilities included in the facility information, upon consideration of the vehicle's travel direction specified by the current position measurement section 12—facilities to be displayed on the display section 4 (S206). In the case of left-side driving, the facility selection device 22 selects facilities located on the left side with respect to the vehicle's travel direction; facilities on the right side are not selected. In the case of right-side driving, the facility selection device 22 selects facilities located on the right side with respect to the vehicle's travel direction; facilities on the left side are not selected.

Figure 3A:
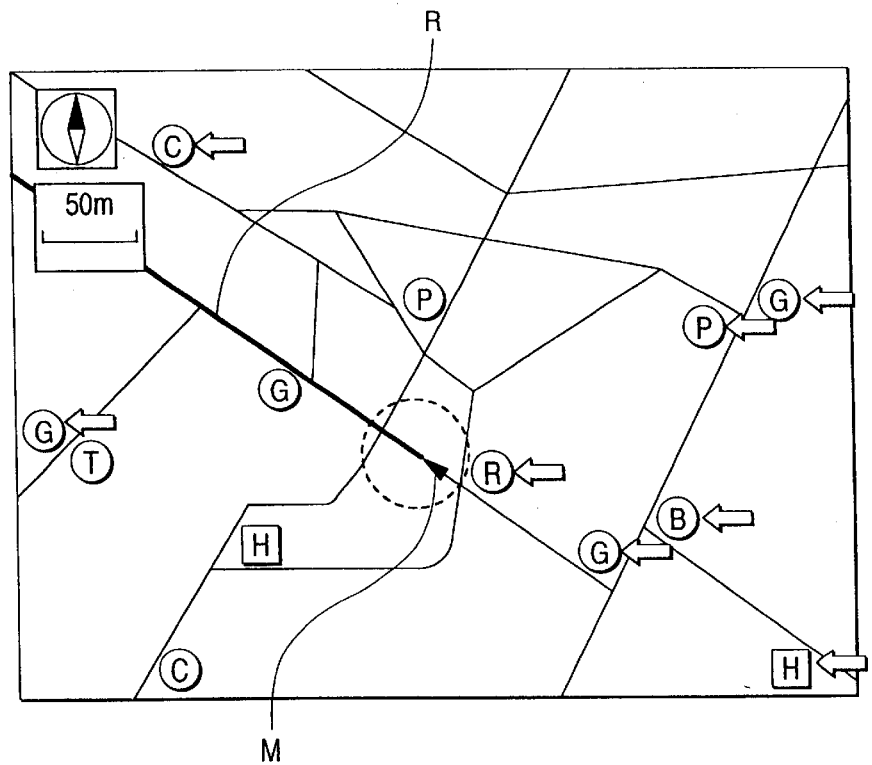
FIGS. 3A and 3B are example landmark display screens appearing on the vehicle-mounted navigation system shown in FIG. 1.
Figure 3B:
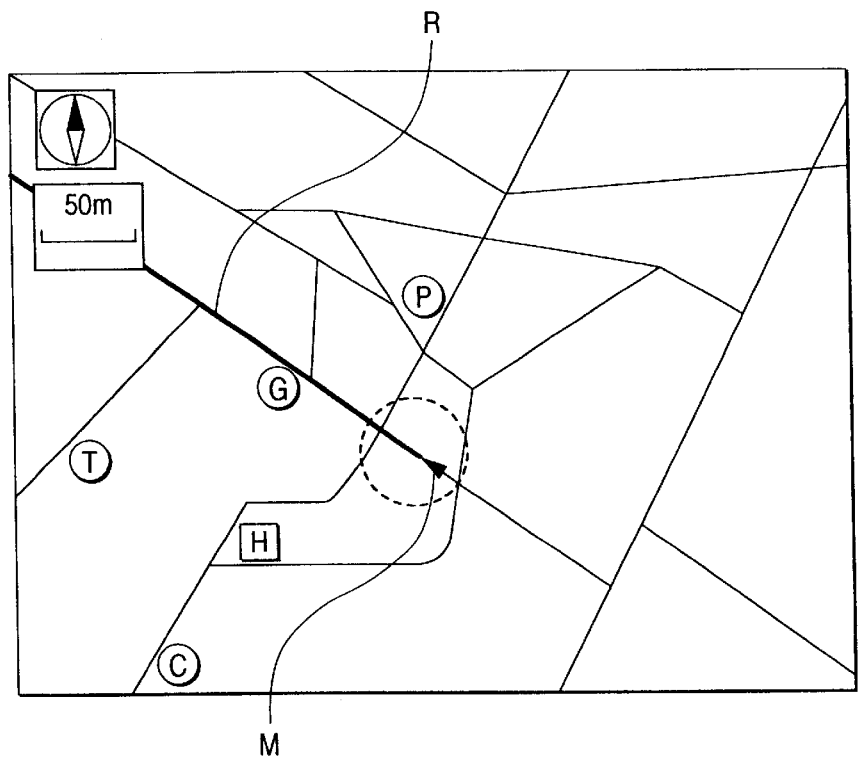
Figure 4:
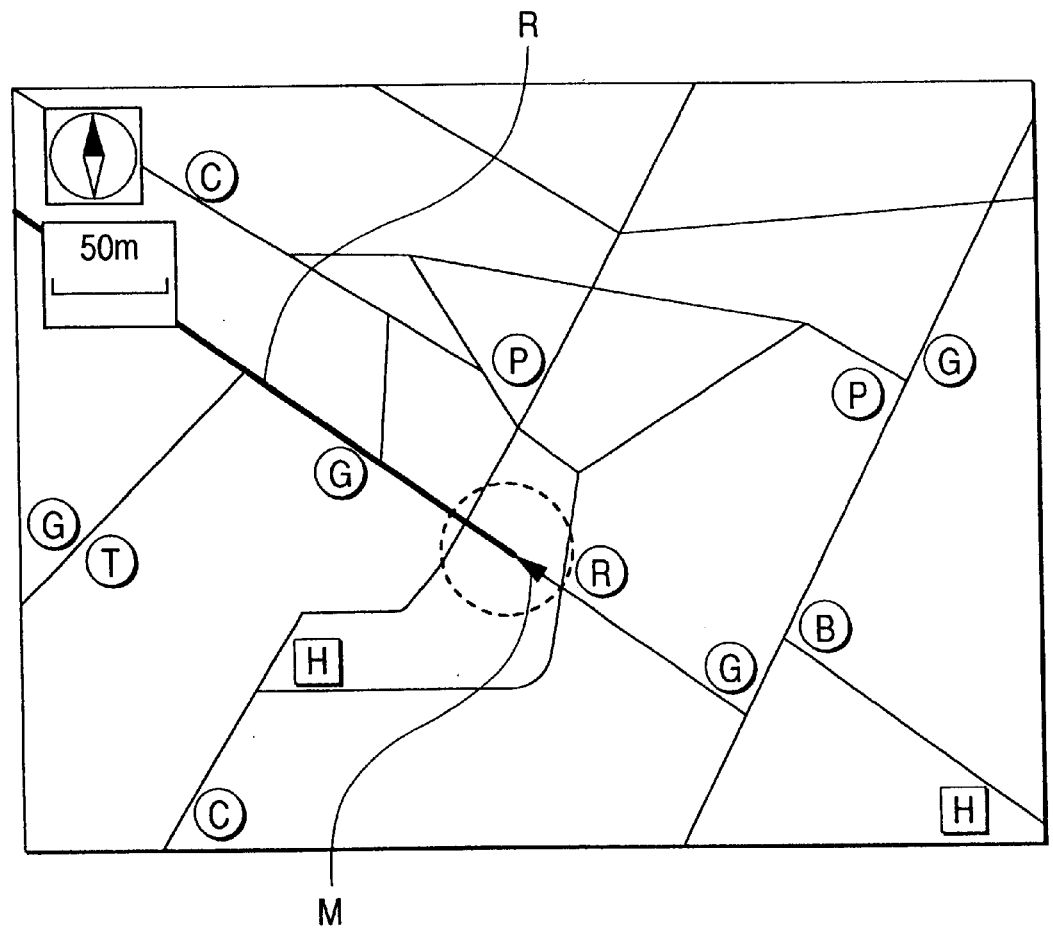
FIG. 4 is an example landmark display screen appearing on a related vehicle-mounted navigation system.

FIGS. 3A and 3B show an example map screen having landmarks displayed thereon. In FIGS. 3A and 3B, C designates a convenience store; G designates a gas station; R designates a restaurant; B designates a bank; T designates a toilet (public restroom); H designates a hotel; and P designates a parking lot. The current position of the vehicle is indicated by mark M, and the vehicle is traveling along a route R.

In FIG. 3A, in the case of left-side driving, landmarks assigned to facilities which are located on the right side and rearward with respect to the vehicle's travel direction are indicated by outlined arrows. Because the vehicle has to make a U-turn in order to make a stop at any one of those facilities and, thereby, encounters difficulty, these landmarks are useless even when displayed on the display section 4. Therefore, the facility selection device 22 deletes the landmarks indicated by the arrows and selects only those facilities located on the left side with respect to the vehicle's travel direction.

As mentioned above, facilities whose landmarks are to be displayed are selected in consideration of the vehicle's travel direction. Therefore, facilities by which the vehicle has passed or facilities located along a lane opposite the current lane can be deleted. As a result, only the landmarks assigned to facilities at which the vehicle can readily make a stop are displayed on the display section 4. Since useless landmarks are not displayed on the display section 4, the map display appearing on the display section 4 is easy to read.

When the facility selection device 22 selects facilities located on the left side with respect to the vehicle's travel direction, in the case of left-side driving, the facility display device 23 shows on the display section 4 only landmarks assigned to the thus-selected facilities, as shown in FIG. 3B (S207).

When the landmarks are displayed, a determination is made as to whether or not display of landmarks is completed (S208). If display of landmarks is determined not to be completed, another determination is made as to whether or not the display screen on the display section 4 is to be updated (S209). If there is no necessity for scrolling a display screen, as when the vehicle remains stationary, processing returns to step S207, where the screen is continuously displayed in unmodified form. In contrast, if there is a necessity for updating a display screen, processing returns to step S205 where new facility information is acquired and, subsequently, the display screen is updated.

Alternatively, when the driver enters an instruction for terminating display of landmarks by way of the input section 2 (S208), display of landmarks is finished (S210).

A program for fulfilling processing operations of the vehicle-mounted navigation system can be recorded on a recording medium. The recording medium is loaded into a computer system, and the thus-loaded program is executed to thereby fulfill processing operations of the vehicle-mounted navigation system while controlling the computer system. Here, the expression "recording medium" includes, for example, devices capable of recording a program, such as memory devices, magnetic disk drives, and optical disk drives.

As has been described above, according to the vehicle-mounted navigation system, and according to the recording medium having recorded thereon a processing program for use with the navigation system, facilities whose landmarks are to be displayed are selected upon consideration of the vehicle's travel direction. Accordingly, facilities by which the vehicle has passed, and facilities located on a lane opposite the current lane of the vehicle's travel, can be deleted. As a result, only landmarks assigned to the facilities at which the vehicle can readily make a stop are displayed on a display section. Consequently, useless landmarks are eliminated from the display section, and a map display appearing on the display section is easy to read.

While preferred embodiments of the invention have been described above, one of ordinary skill in the art would readily recognize modifications which would be within the scope of the invention which is to be limited only by the following claims.

What is claimed is:

1. A vehicle-mounted navigation system which detects the current position and direction of travel of a vehicle, retrieves a route to a set destination, guides the vehicle to the destination along the route, and displays landmarks assigned to facilities located around the route, the system comprising:

a facility information acquisition device which acquires facility information, wherein the facility information is position information pertaining to the facilities located around the route;

a facility selection device which selects, from among the facilities recorded in the facility information, upon consideration of the vehicle's travel direction, facilities whose landmarks are to be displayed on a display section; and a landmark display device, including the display section, which displays landmarks of the facilities selected by the facility selection device.

2. The vehicle-mounted navigation system as defined in claim 1, wherein, in the case of left-side driving, the facility selection device does not select facilities located on the right side with respect to the vehicle's travel direction.

3. A vehicle-mounted navigation system which detects the current position and direction of travel of a vehicle, retrieves a route to a set destination, guides the vehicle to the destination along the route, and displays landmarks assigned to facilities located around the route, the system comprising:

a facility information acquisition device which acquires facility information, wherein facility information is position information pertaining to the facilities located around the route;

a facility selection device which selects, from among the facilities recorded in the facility information, upon consideration of the vehicle's travel direction, facilities whose landmarks are to be displayed on a display section; and a landmark display device, including the display section, which displays landmarks of the facility selected by the facility selection device;

wherein in the case of right-side driving, the facility selection device does not select facilities located on the left side with respect to the vehicle's travel direction.

4. The vehicle-mounted navigation system as defined in claim 1, wherein the landmark display device displays landmarks which are representative of the type of facility designated thereby.

5. The vehicle mounted navigation system as defined in claim 1, wherein said facility selection device does not select for display, facilities whose landmarks are located rearward with respect to the vehicle's travel direction.

6. A computer readable medium having recorded thereon a processing program for use with a vehicle-mounted navigation system, which system detects the current position and direction of travel of a vehicle, retrieves a route to a set destination, guides the vehicle to the destination along the route, and displays landmarks assigned to facilities located around the route, the program comprising:

a facility information acquisition processing routine for acquiring facility information, wherein the facility information is position information pertaining to the facilities located around the route;

a facility selection processing routine for selecting, from among the facilities recorded in the facility information, upon consideration of the vehicle's travel direction, facilities whose landmarks are to be displayed on a display section; and a landmark display processing routine for displaying, on the display section, landmarks of the facilities selected by the facility selection processing routine.

7. The computer readable medium for use with a vehicle-mounted navigation system as defined in claim 6, wherein, in the case of left-side driving, the facility selection processing routine does not select facilities located on the right side with respect to the vehicle's travel direction.

8. A computer readable medium having recorded thereon a processing program for use with a vehicle-mounted navigation system, which system detects the current position and direction of travel of a vehicle, retrieves a route to a set destination, guides the vehicle to the destination along the route, and displays landmarks assigned to facilities located around the route, the program comprising:

a facility information acquisition processing routine for acquiring facility information, wherein the facility information is position information pertaining to the facilities located around the route;

a facility selection processing routine for selecting, from among the facilities recorded in the facility information, upon consideration of the vehicle's travel direction, facilities whose landmarks are to be displayed on a display section;

a landmark display processing routine for displaying, on the display section, landmarks of the facilities selected by the facility selection processing routine; and a computer readable medium wherein in the case of right-side driving, the facility selection processing routine does not select facilities located on the left side with respect to the vehicle's travel direction.

9. The computer readable medium for use with a vehicle-mounted navigation system as defined in claim 6, wherein the landmark display processing routine displays landmarks which are representative of the type of facility designated thereby.

10. The computer readable medium for use with a vehicle mounted navigation system as defined in claim 6, wherein said facility selection processing routine does not select for display, facilities whose landmarks are located rearward with respect to the vehicle's travel direction.

* * * * *